Feb. 25, 1936.  L. BUTLER ET AL  2,031,874
BIRD FEED RECEPTACLE
Filed March 26, 1934
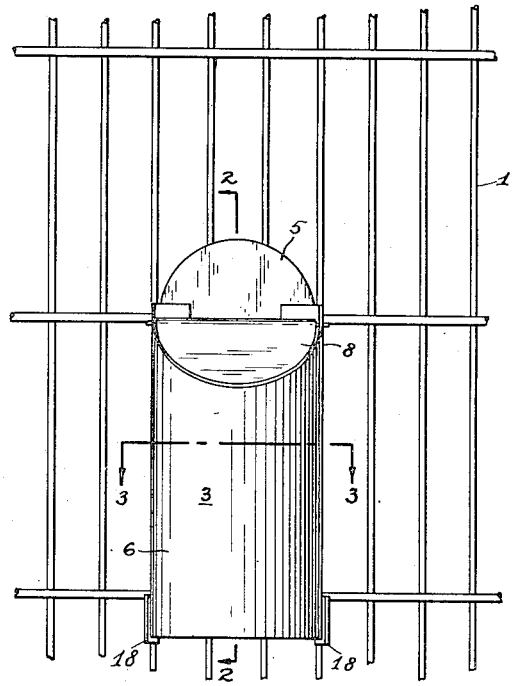
Fig. 1.
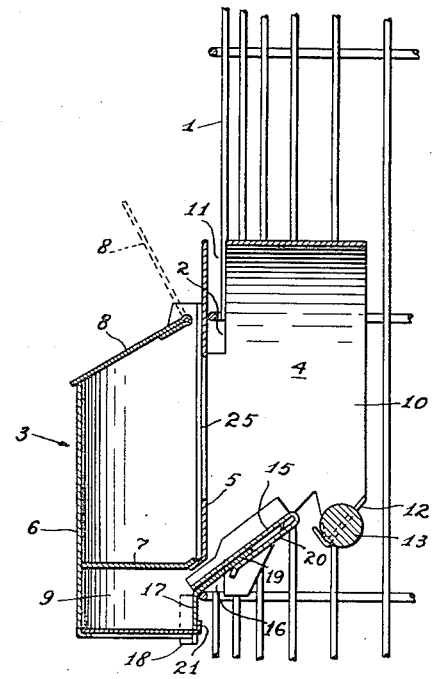
Fig. 2.
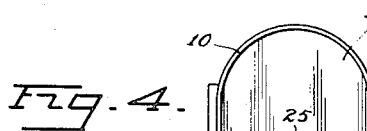
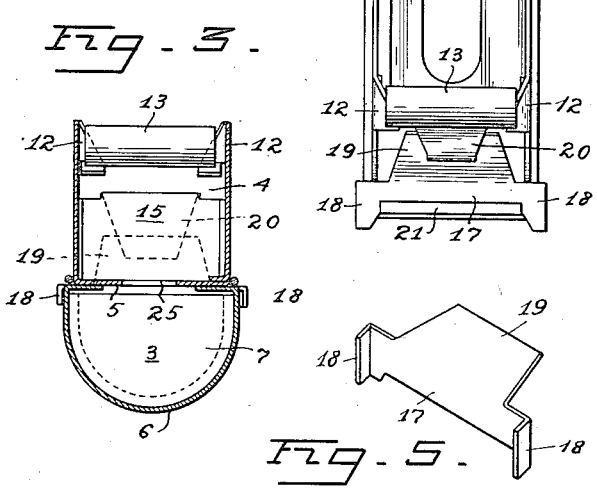
Fig. 4.
Fig. 3.
Fig. 5.
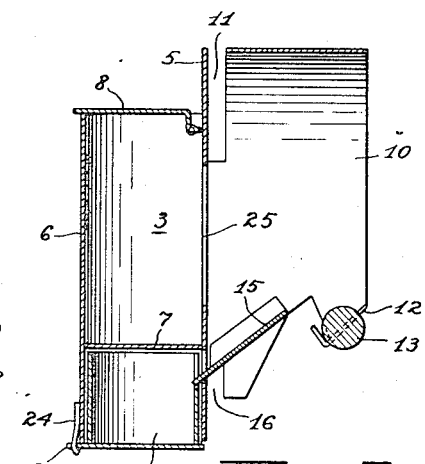
Fig. 6.
INVENTORS
LUDOVICA BUTLER
JOSEPH D. BUTLER
BY Lincoln Johnson
ATTORNEY Patented Feb. 25, 1936

2,031,874

UNITED STATES PATENT OFFICE 2,031,874

BIRD FEED RECEPTACLE

Ludovica Butler and Joseph D. Butler, San Francisco, Calif.

Application March 26, 1934, Serial No. 717,449

7 Claims. (Cl. 119—18)

This invention relates particularly to a bird seed feed trough for bird cages.

It is an object of this invention to provide a bird feed receptacle to be removably mounted on a bird cage, wherein the receptacle may be filled with feed from a point outside of the cage, and waste feed, chaff and the like, may be removed from the receptacle without having to remove the said receptacle from the cage.

A further object of the invention is to provide a feed receptacle for birds to be detachably mounted on a bird cage, said receptacle being of a size proportionate to the size of the bird which is to feed therein, and being so constructed that the bird has easy access to the feed, but the restricted area of the receptacle prevents the bird from scattering or dropping the feed outside of the receptacle, and such feed as might be scattered or dropped within the receptacle is collected in a waste container mounted on the outside of the cage.

A still further object of the invention is to provide a bird feed receptacle consisting of a feed trough to be mounted outside of the bird cage and an integral booth-like vestibule to be mounted on the inside of the cage, said vestibule registering with an opening in the feed trough, and the space between the vestibule and trough providing an area which permits the assembly to be mounted upon or removed from the bird cage, said cage having an opening therein somewhat smaller in size than that of the vestibule.

Other objects and advantages are to provide a bird seed feed trough for bird cages that will be superior in point of simplicity, inexpensiveness of construction, positiveness of operation, and facility and convenience in use and general efficiency.

In this specification and the annexed drawing, the invention is illustrated in the forms considered to be the best, but it is to be understood that the invention is not limited to such forms, because it may be embodied in other forms; and it is also to be understood that in and by the claims following the description, it is desired to cover the invention in whatsoever form it may be embodied.

In the accompanying one sheet of drawings:

Fig. 1 is a front elevation of a portion of a bird cage having a bird feed receptacle constructed in accordance with our invention mounted therein.

Fig. 2 is a vertical cross section taken through Fig. 1 on the line 2—2.

Fig. 3 is a plan section taken through Fig. 1 on the line 3—3.

Fig. 4 is a front elevation of the vestibule carried on the rear side of the feed receptacle.

Fig. 5 is a perspective view of the door for holding the waste and dropped food in the waste compartment of the receptacle.

Fig. 6 is a vertical cross section taken through a bird feed receptacle having a modified form of waste collection chamber therein.

In detail the construction illustrated in the drawing consists of a bird cage generally designated by the numeral 1, a portion of which is cut away as at 2, to provide an opening in the cage thru which the feed receptacle may be inserted or withdrawn. The feeding device consists of a feed receptacle 3 and a hooded vestibule 4, both of which are joined together. Two or more of the vertical wires of the cage are removed to provide the opening 2, said opening being slightly wider than the vestibule 4 but slightly narrower than the feed receptacle 3. The feed receptacle 3 is provided with a back wall 5 which is adapted to rest against the outside of the cage over the opening 2, a semicircular front wall 6, a bottom wall 7, and a hinged cover 8. A waste compartment 9 is provided in the receptacle 3 beneath the bottom wall 7.

The hooded vestibule 4 is adapted to lie within the bird cage and consists of side and top walls 10. A portion of the edge of each side wall adjacent the rear side of the wall 5, is notched as at 11, to provide a space within which the cage may extend. Edges of the opposite walls 10 of the vestibule are flanged inwardly as at 12 to provide supports for the opposite ends of the perch 13. A transverse and angularly inclined wall 15 is arranged at the bottom of the vestibule 4, to provide a chute which extends downwardly into communication into the waste compartment 9 beneath the feed receptacle 3. The bottom sides of the chute 15 have cut-out portions 16 therein which are adapted to receive the wall of the bird cage therein and to support the said feed receptacle in the cage.

The rear side of the waste receptacle 9 is closed by a door 17, said door 17 having flanges 18 at opposite ends thereof, which pass around opposite sides of the back of the receptacle, and a tongue piece 19 to pass into a guide 20 formed on the under side of the chute 15. The rear side of the waste compartment 9 has an upstanding flange 21 thereon to engage behind the rear side of the door 17, which, in conjunction with the tongue piece 19 and the flanges 18 on the said door, holds the same securely in position over the opening in the waste compartment.

It is desirable that the door be only removed from the waste compartment when the entire feed receptacle has been withdrawn from the bird cage and the door is removed by disengaging it from the flange 21 and thereafter removing the tongue piece 19 from the guide 20, permitting the contents of the waste compartment to be dumped therefrom.

In the modified form of waste compartment shown in Fig. 6, we have provided a drawer 22 which is adapted to be moved vertically into and from engagement with the waste compartment, the said drawer having a shoulder 23 thereon, to frictionally engage behind a detent 24 for holding the drawer 22 in position in the waste compartment to receive waste material therein.

The rear wall 2 of the receptacle is provided with an opening 25 therein, permitting a bird resting on the perch 13 to withdraw feed from the receptacle 3. The opening 25 is only large enough to permit the insertion of the head of the bird therethru. The width of the hooded vestibule 4 is also arranged proportionally to the size of the bird which is to obtain its feed from the receptacle 3. It has been found that where the bird is limited in its feeding area to a restricted space, it cannot waste its feed by swishing or pecking it about. Such feed as the bird might drop, or such chaff as the bird might discard, will be deflected by the chute 15 down into the waste compartment 9.

We have found it highly desirable to make the feed receptacle and hooded vestibule entirely out of material such as relatively thick celluloid or like material. This material comes in many desirable colors which lend themselves readily to being used for the purpose indicated. We preferably make the feed receptacle portion of the device of obscure translucent material, so that the bird, when taking feed from the receptacle, will not be disturbed by occurrences outside of the cage. The hooded vestibule 4 is preferably made of clear translucent material.

The feed supply in the receptacle 3 may be replenished from the outside and likewise, in the modified form of the invention, the waste material may be removed from the device from the outside of the bird cage. In order to install or withdraw the device from the bird cage, the same is lifted vertically to permit the upper portion of the bird cage lying within the slot 11 to move downwardly a sufficient distance therein, until the bottom slotted portion 16 clears the cage, and allows the lower end of the vestibule within the cage to be swung outwardly, and thereafter for the vestibule to be dropped downwardly until the said vestibule portion will pass through the opening in the cage. The perch 13 is made so that it may be removed for cleansing purposes. Likewise the material out of which the receptacle and vestibule are made, may be readily cleansed with water, and the entire apparatus may be installed within or removed from the bird cage with a minimum of effort.

The back wall 5 of the outer receptacle having the opening 25 therein, forms the front wall of the hooded vestibule 4, and said wall is preferably made out of transparent material, whereby the bird may have a clear view of the entire inside of the feed receptacle, whereas if the wall 5 were made of opaque material, the bird could only see the contents of the feed receptacle by inserting its head through the opening 25. The top portion of the hooded vestibule serves to protect the bird within the vestibule, from excrement or other matter falling onto the said vestibule from above.

Having thus described this invention, what we claim and desire to secure by Letters Patent is:

1. A bird feed receptacle for bird cages, comprising a closed compartment located outside the cage for holding the bird feed and having an opening in the side thereof adjacent the cage; a hooded vestibule attached to the side of the compartment having the opening therein and located within the cage, said compartment and vestibule being notched to receive a portion of the cage therein for removably supporting the receptacle on the cage.

2. A bird feed receptacle for bird cages, comprising a closed compartment located outside the cage for holding the bird feed and having on opening in the side thereof adjacent the cage; a hooded vestibule attached to the side of the compartment having the opening therein and located within the cage, said compartment and vestibule being notched to receive a portion of the cage therein for removably supporting the receptacle; a perch arranged transversely in the vestibule; an inclined chute extended from beneath the vestibule toward the bottom of the feed compartment; and a collection bin below the feed compartment in communication with the discharge end of said chute.

3. In combination, a bird cage having an opening therein and a feed receptacle of greater length and width than the said opening adapted to be removably positioned therein, said receptacle including a feed holding compartment located outside of the cage and a hooded vestibule, connected to said compartment, located inside of the cage, said receptacle being notched on its upper and lower ends in alignment with the wall of the cage adjacent the opening, to receive the cage wall therein when installing the receptacle in and removing it from the opening in the cage, and for supporting the receptacle on the cage.

4. In combination, a bird cage having an opening therein and a feed receptacle of greater length and width than the said opening adapted to be removably positioned therein, said receptacle including a feed holding compartment located outside of the cage and a hooded vestibule, connected to said compartment, located inside of the cage, said receptacle being notched on its upper and lower ends in alignment with the wall of the cage adjacent the opening, to receive the cage wall therein when installing the receptacle in and removing it from the opening in the cage, and for supporting the receptacle on the cage; a perch in said vestibule on which a bird may stand when obtaining food from the compartment; a removable waste collector beneath the compartment on the outside of the cage; and a chute extended from the perch to the waste collector.

5. A feeding receptacle for bird cages consisting of a closed feed compartment located outside of the cage and a hooded vertibule integral with the compartment and located within the cage, said feed compartment having an opening therein adjacent the vestibule and an opening outside of the cage to fill the feed compartment; a waste feed collection chamber beneath the feed compartment having a part thereof removable outside of the cage to empty the waste feed chamber; and a chute to deflect waste feed from the vestibule into the waste collection chamber.

6. A feeding receptacle for bird cages consisting of a non-translucent closed feed compartment located outside of the cage and a translucent hooded vestibule integral with the compartment and located within the cage, said feed compartment having an opening therein adjacent the vestibule and an opening outside of the cage to fill the feed compartment; a waste feed collection chamber beneath the feed compartment having a part thereof removable outside of the cage to empty the waste feed chamber; and a chute to deflect waste feed from the vestibule into the waste collection chamber.

7. A feeding receptacle for bird cages consisting of a closed feed compartment located outside of the cage and a hooded vestibule integral with the compartment and located within the cage, said feed compartment having an opening therein adjacent the vestibule and an opening outside of the cage to fill the feed compartment; a waste feed collection chamber beneath the feed compartment having a part thereof removable outside of the cage to empty the waste feed chamber; a chute to deflect waste feed from the vestibule into the waste collection chamber; and a perch removably mounted in said vestibule.

LUDOVICA BUTLER.
JOSEPH D. BUTLER.